(12) United States Patent
Kabeya et al.

(10) Patent No.: US 11,662,565 B2
(45) Date of Patent: May 30, 2023

(54) MICROSCOPE SYSTEM, PROJECTION UNIT, AND IMAGE PROJECTION METHOD

(71) Applicant: Evident Corporation, Nagano (JP)

(72) Inventors: Akifumi Kabeya, Tokyo (JP); Tetsuya Shirota, Tokyo (JP); Tatsuo Nakata, Tokyo (JP)

(73) Assignee: EVIDENT CORPORATION, Nagano (JP)

( * ) Notice: Subject to any disclaimer, the term of this patent is extended or adjusted under 35 U.S.C. 154(b) by 0 days.

(21) Appl. No.: 17/196,634

(22) Filed: Mar. 9, 2021

(65) Prior Publication Data

US 2021/0191101 A1 Jun. 24, 2021

Related U.S. Application Data

(63) Continuation of application No. PCT/JP2018/047492, filed on Dec. 25, 2018.

(30) Foreign Application Priority Data

Sep. 28, 2018 (JP) .............................. JP2018-183760

(51) Int. Cl.
*G02B 21/36* (2006.01)
*G06T 7/00* (2017.01)
(Continued)

(52) U.S. Cl.
CPC .......... *G02B 21/365* (2013.01); *G06T 7/0012* (2013.01); *G06T 11/60* (2013.01);
(Continued)

(58) Field of Classification Search
None
See application file for complete search history.

(56) References Cited

U.S. PATENT DOCUMENTS

| 4,672,559 A | 6/1987 | Jansson et al. |
| 6,239,909 B1 | 5/2001 | Hayashi et al. |

(Continued)

FOREIGN PATENT DOCUMENTS

| JP | S61156214 A | 7/1986 |
| JP | H0580255 A | 4/1993 |

(Continued)

OTHER PUBLICATIONS

International Search Report (ISR) (and English translation thereof) dated Mar. 12, 2019 issued in International Application No. PCT/JP2018/047499.

(Continued)

*Primary Examiner* — Reza Aghevli
(74) *Attorney, Agent, or Firm* — Holtz, Holtz & Volek PC

(57) ABSTRACT

A microscope system 1 includes an eyepiece 104, an objective 102 that guides light from a sample to the eyepiece 104, and a tube lens 103 that is disposed on a light path between the eyepiece 104 and the objective 102 and forms an optical image of the sample on the basis of light therefrom. The microscope system 1 further includes a projection apparatus 133 that projects first and second projection images onto an image plane on which the optical image is formed, in a manner such that the first and second projection images are capable of being distinguished from each other. The first projection image is based on an analysis result provided by a computer for the digital image data of the sample. The second projection image is based on an input operation performed by a user and includes at least input information provided by the user.

19 Claims, 13 Drawing Sheets

(51) Int. Cl.
*G06T 11/60* (2006.01)
*H04N 7/18* (2006.01)

(52) U.S. Cl.
CPC ... *H04N 7/183* (2013.01); *G06T 2207/10056* (2013.01); *G06T 2207/20084* (2013.01)

(56) References Cited

U.S. PATENT DOCUMENTS

| | | | | |
|---|---|---|---|---|
| 6,304,372 | B1* | 10/2001 | Spink | G02B 21/22 359/368 |
| 6,483,948 | B1* | 11/2002 | Spink | G02B 21/22 348/46 |
| 7,428,324 | B2* | 9/2008 | Crandall | G02B 21/008 382/128 |
| 9,971,966 | B2 | 5/2018 | Nelson et al. | |
| 10,078,205 | B2* | 9/2018 | Hauger | G02B 21/22 |
| 2001/0055062 | A1* | 12/2001 | Shioda | G02B 21/22 348/79 |
| 2003/0123717 | A1 | 7/2003 | Bacus et al. | |
| 2006/0228107 | A1 | 10/2006 | Takamatsu et al. | |
| 2007/0076232 | A1* | 4/2007 | Olschewski | G02B 21/365 358/1.9 |
| 2007/0147673 | A1* | 6/2007 | Crandall | G02B 21/367 382/128 |
| 2012/0013728 | A1 | 1/2012 | Matsuo | |
| 2013/0044185 | A1* | 2/2013 | Krishnaswamy | A61B 5/7257 348/45 |
| 2013/0070077 | A1 | 3/2013 | Winkelman et al. | |
| 2013/0188033 | A1 | 7/2013 | Oda et al. | |
| 2014/0072195 | A1 | 3/2014 | Zhang et al. | |
| 2014/0314299 | A1 | 10/2014 | Santamaria-Pang et al. | |
| 2014/0333997 | A1 | 11/2014 | Oda | |
| 2014/0340426 | A1 | 11/2014 | Furuhata | |
| 2015/0049936 | A1 | 2/2015 | Tsunomori et al. | |
| 2015/0130920 | A1* | 5/2015 | Zou | G02B 21/361 348/79 |
| 2015/0209116 | A1 | 7/2015 | Wirth et al. | |
| 2015/0213599 | A1 | 7/2015 | Buzaglo et al. | |
| 2015/0370059 | A1* | 12/2015 | Hoegele | G02B 21/025 359/377 |
| 2016/0062098 | A1 | 3/2016 | Brown | |
| 2016/0103308 | A1* | 4/2016 | Furuya | G02B 13/0095 359/368 |
| 2016/0116724 | A1* | 4/2016 | Abe | G02B 21/33 359/656 |
| 2016/0166194 | A1 | 6/2016 | Gareau et al. | |
| 2016/0170194 | A1* | 6/2016 | Mueller | G02B 21/0012 359/376 |
| 2016/0206198 | A1* | 7/2016 | Weber | G02B 21/22 |
| 2016/0266369 | A1* | 9/2016 | Hauger | G02B 21/22 |
| 2016/0357003 | A1* | 12/2016 | Hauger | G02B 21/368 |
| 2017/0262984 | A1 | 9/2017 | Barnes et al. | |
| 2018/0267287 | A1* | 9/2018 | Regensburger | G02B 21/025 |
| 2018/0275388 | A1* | 9/2018 | Zou | G02B 21/02 |
| 2018/0307034 | A1* | 10/2018 | Saur | A61B 1/04 |
| 2018/0348496 | A1 | 12/2018 | Brown | |
| 2019/0076020 | A1* | 3/2019 | Steffen | A61B 34/20 |
| 2019/0195777 | A1 | 6/2019 | Matsubara | |
| 2020/0211233 | A1 | 7/2020 | Siegel et al. | |
| 2021/0192179 | A1* | 6/2021 | Nakata | H04N 5/232 |
| 2021/0192181 | A1* | 6/2021 | Yoneyama | G16H 30/40 |
| 2021/0215923 | A1* | 7/2021 | Nakata | G02B 21/365 |
| 2021/0319208 | A1* | 10/2021 | Ohara | G02B 21/368 |

FOREIGN PATENT DOCUMENTS

| | | |
|---|---|---|
| JP | H07253548 A | 10/1995 |
| JP | H0829694 A | 2/1996 |
| JP | H11242189 A | 9/1999 |
| JP | 2000292422 A | 10/2000 |
| JP | 2001519944 A | 10/2001 |
| JP | 2003116874 A | 4/2003 |
| JP | 2005351916 A | 12/2005 |
| JP | 2006071430 A * | 3/2006 ........... G02B 21/365 |
| JP | 2006071430 A | 3/2006 |
| JP | 2006292999 A | 10/2006 |
| JP | 2006297060 A | 11/2006 |
| JP | 2008090072 A | 4/2008 |
| JP | 2012019748 A | 2/2012 |
| JP | 2013054083 A | 3/2013 |
| JP | 2013072997 A | 4/2013 |
| JP | 2014063041 A | 4/2014 |
| JP | 2014222321 A | 11/2014 |
| JP | 2015141420 A | 8/2015 |
| JP | 2016517115 A | 6/2016 |
| JP | 2016133668 A | 7/2016 |
| JP | 2016526185 A | 9/2016 |
| JP | 2017161262 A | 9/2017 |
| JP | 2018010021 A | 1/2018 |
| JP | 2018054425 A | 4/2018 |
| JP | 2018066908 A | 4/2018 |
| JP | 2018128532 A | 8/2018 |
| WO | 2012117647 A1 | 9/2012 |
| WO | 2013094434 A1 | 6/2013 |
| WO | 2016130424 A1 | 8/2016 |
| WO | 2018042413 A1 | 3/2018 |

OTHER PUBLICATIONS

International Search Report (ISR) (and English translation thereof) dated Mar. 26, 2019 issued in International Application No. PCT/JP2018/047494.

International Search Report (ISR) (and English translation thereof) dated Mar. 26, 2019 issued in International Application No. PCT/JP2018/047498.

U.S. Appl. No. 17/195,916, First Named Inventor: Tatsuo Nakata; Title: "Microscope System, Projection Unit, and Image Projection Method"; filed Mar. 9, 2021.

U.S. Appl. No. 17/196,705, First Named Inventor: Tatsuo Nakata; Title: "Microscope System"; filed Mar. 9, 2021.

U.S. Appl. No. 17/196,921, First Named Inventor: Takashi Yoneyama; Title: "Microscope System and Projection Unit"; filed Mar. 9, 2021.

U.S. Appl. No. 17/195,916, filed Mar. 9, 2021.

U.S. Appl. No. 17/196,705, filed Mar. 9, 2021.

U.S. Appl. No. 17/196,921, filed Mar. 9, 2021.

International Search Report (ISR) (and English translation thereof) dated Mar. 26, 2019 issued in International Application No. PCT/JP2018/047492.

Chinese Office Action (and English language translation thereof) dated May 12, 2022, issued in counterpart Chinese Application No. 201880097755.4.

Chinese Office Action dated May 7, 2022, issued in Chinese Application No. 201880097760.5 (which is a Chinese counterpart of related U.S. Appl. No. 17/195,916).

Microscope World, Infinity Corrected Optics, Apr. 2015, www.microscopeworld.co/t-infinity corrected optics.aspx (Year: 2015).

Office Action (Non-Final Rejection) dated Jun. 22, 2022, issued in related U.S. Appl. No. 17/196,921.

Chinese Office Action dated Apr. 29, 2022, issued in Chinese Application No. 201880097737.6 (which is a counterpart of related U.S. Appl. No. 17/196,705).

Japanese Office Action dated Apr. 5, 2022 (and English translation thereof) issued in Japanese Application No. 2020-547904.

Japanese Office Action dated Apr. 5, 2022 (and English translation thereof) issued in Japanese Application No. 2020-547904 (which is a counterpart of related U.S. Appl. No. 17/196,921).

Japanese Office Action (and English language translation thereof) dated Apr. 19, 2022, issued in counterpart Japanese Application No. 2020-547901.

Japanese Office Action (and English language translation thereof) dated Apr. 19, 2022, issued in Japanese Application No. 2020-547903 (which is a counterpart of related U.S. Appl. No. 17/195,916).

Japanese Office Action (and English language translation thereof) dated Apr. 26, 2022, issued in Japanese Application No. 2020-547902 (which is a counterpart of related U.S. Appl. No. 17/196,705).

(56) References Cited

OTHER PUBLICATIONS

Chinese Office Action (and English language translation thereof) dated Jul. 5, 2022, issued in Chinese Application No. 201880097759.2 (which is a counterpart of related U.S. Appl. No. 17/196,921).
Japanese Office Action (and English language translation thereof) dated Nov. 1, 2022, issued in Japanese Application No. 2020-547904 (which is a Japanese counterpart of related U.S. Appl. No. 17/196,921).
Office Action (Non-Final Rejection) dated Mar. 28, 2023, issued in related U.S. Appl. No. 17/195,916.

* cited by examiner

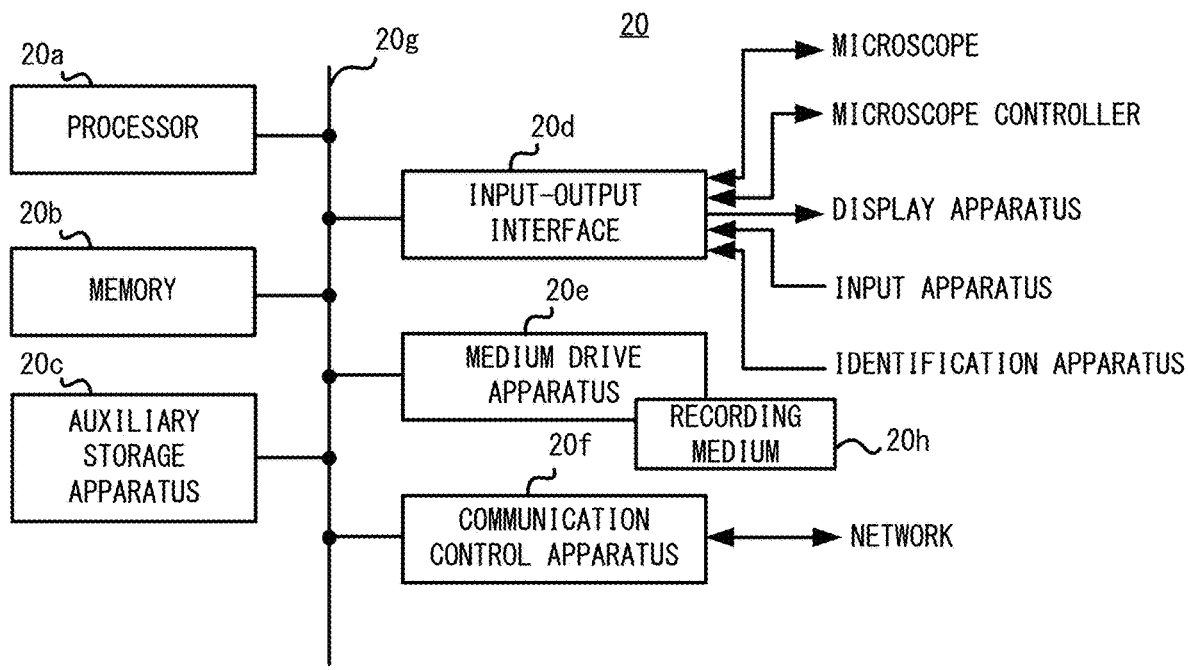
F I G. 2

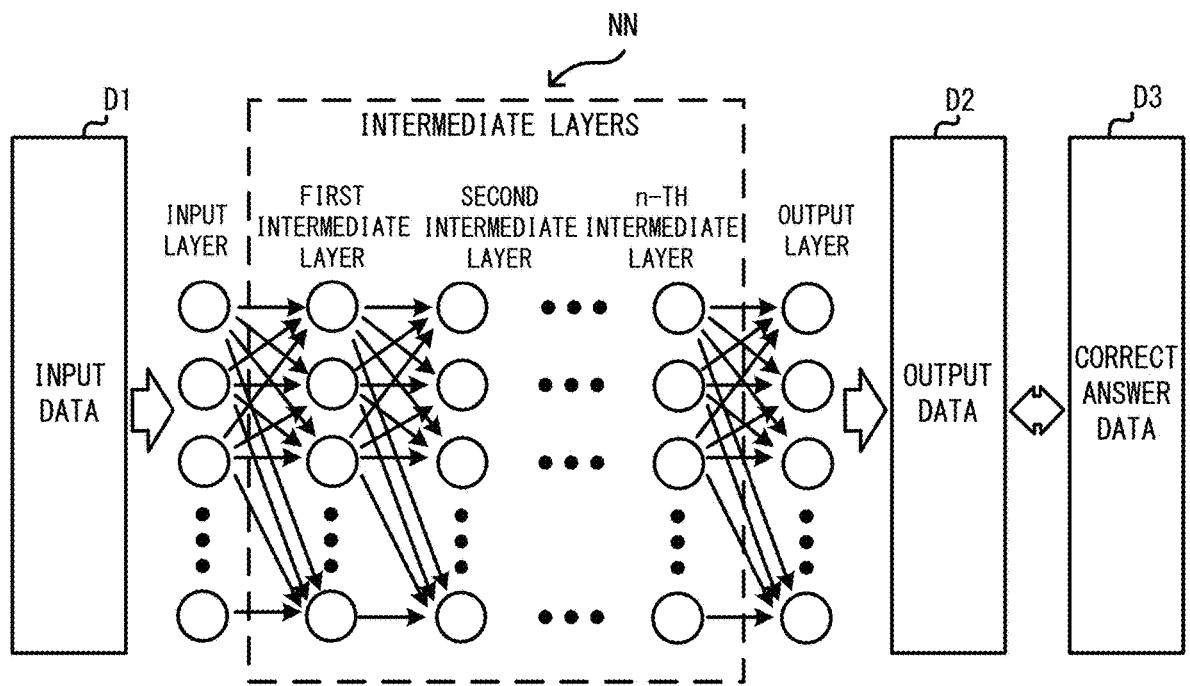
F I G. 8

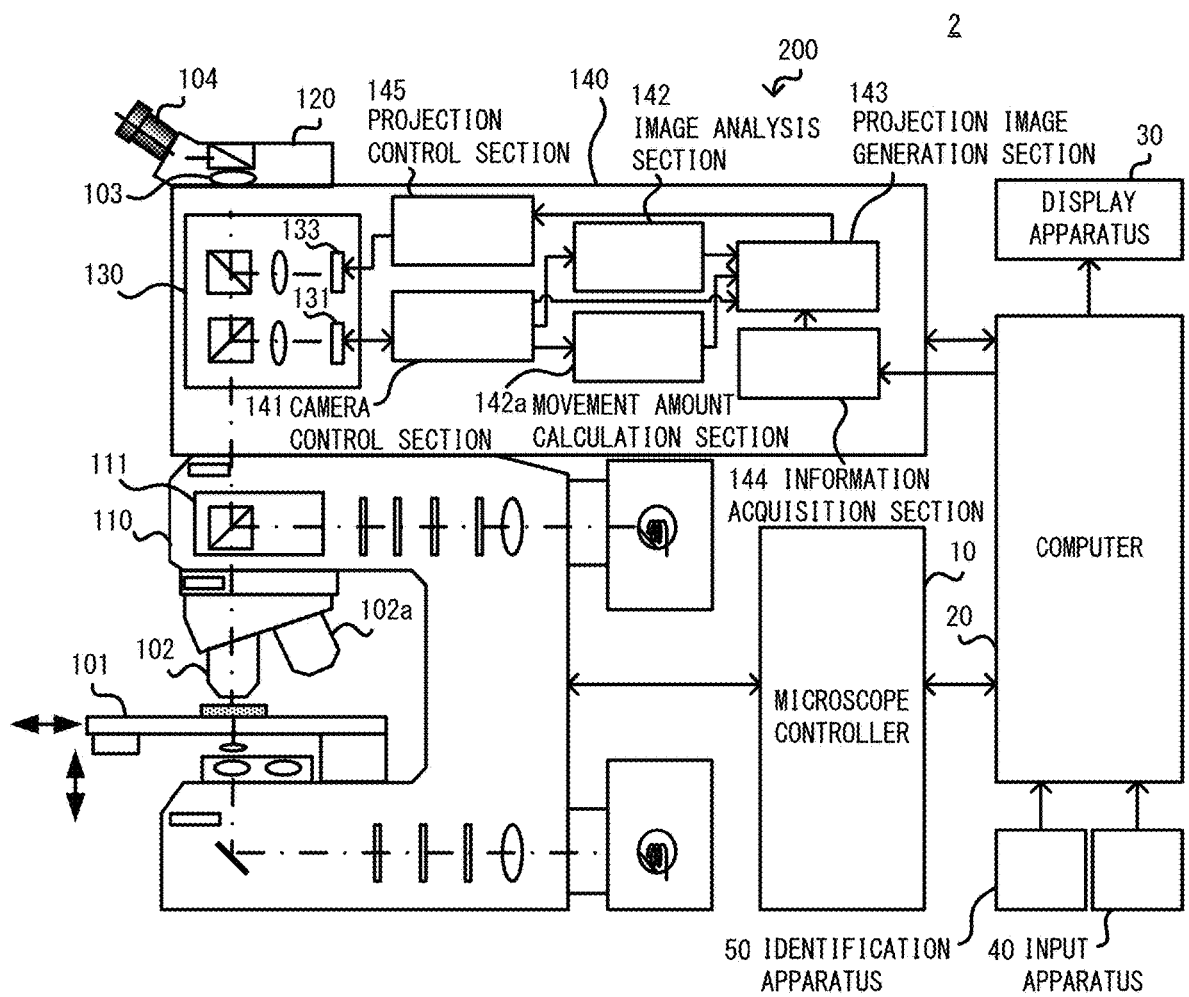
F I G. 9

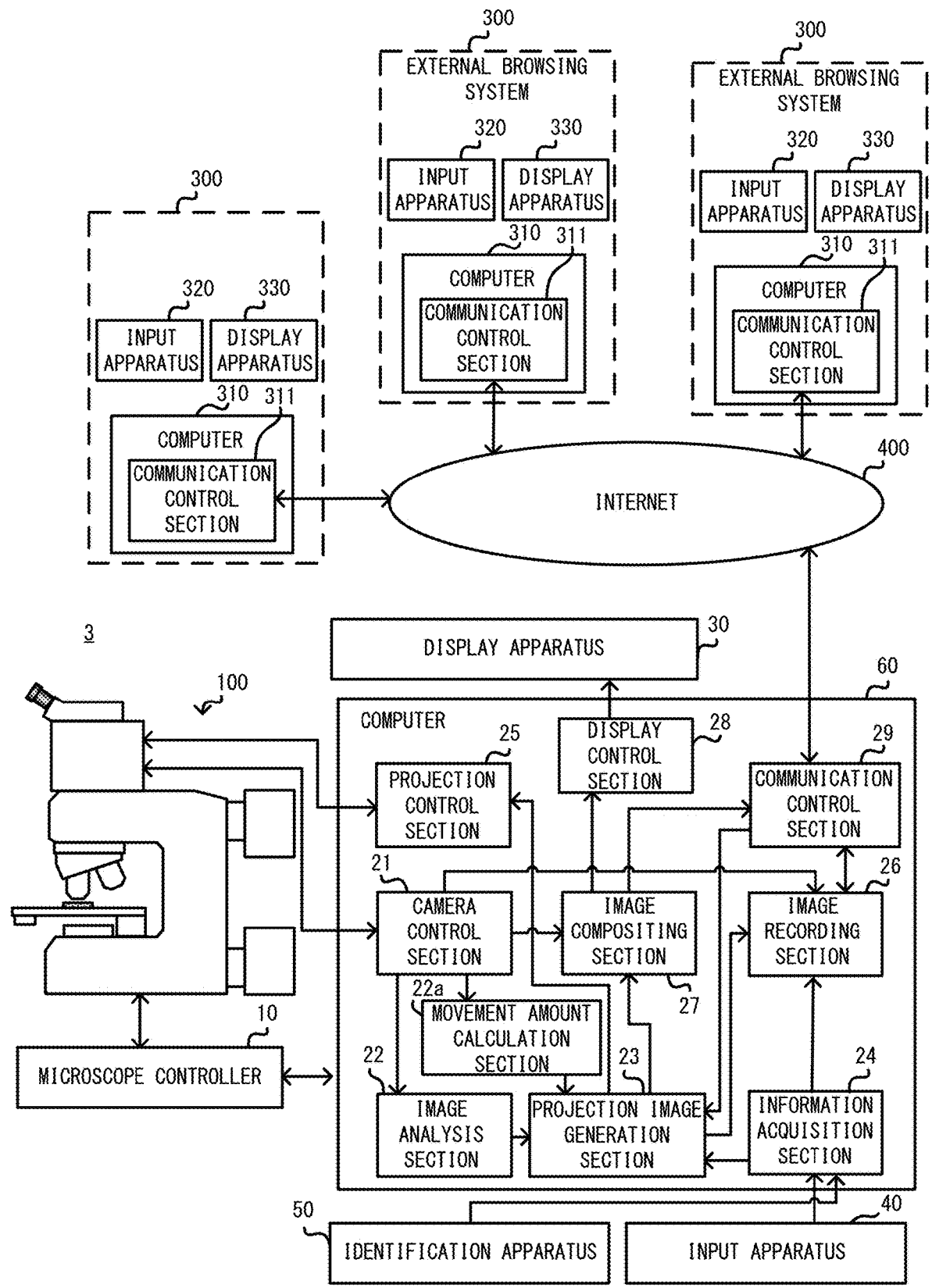
F I G. 10

MICROSCOPE SYSTEM, PROJECTION UNIT, AND IMAGE PROJECTION METHOD

CROSS REFERENCE TO RELATED APPLICATIONS

This application is based upon and claims the benefit of priority of the prior Japanese Patent Application No. 2018-183760, filed Sep. 28, 2018, the entire contents of which are incorporated herein by reference.

This is a Continuation Application of PCT Application No. PCT/JP2018/047492, filed Dec. 25, 2018, which was not published under PCT Article 21(2) in English.

BACKGROUND OF THE INVENTION

Field of the Invention

The disclosures herein relate to a microscope system, a projection unit, and an image projection method.

Description of the Related Art

The whole slide imaging (WSI) technique has attracted attention as a technique for reducing the burden on pathologists in pathological diagnoses. The WSI technique is a technique for creating a whole slide image (WSI), which is a digital image of the entire area of a specimen on slide glass. A pathologic can enjoy various advantages by performing a diagnosis with a WSI, i.e., a digital image, displayed on a monitor. In particular, the advantages include the ones wherein cumbersome microscope operations do not need to be performed during the diagnosis, the display magnification can be easily changed, and a plurality of pathologists can be concurrently involved in the diagnosis. Such a WSI technique is described in, for example, Japanese National Publication of International Patent Application No. 2001-519944.

SUMMARY OF THE INVENTION

A microscope system in accordance with an aspect of the present invention includes: an eyepiece; an objective that guides light from a sample to the eyepiece; a tube lens that is disposed on a light path between the eyepiece and the objective and forms an optical image of the sample on the basis of light from the sample; and a projection apparatus that projects first and second projection images onto an image plane on which the optical image is formed, in a manner such that the first and second projection images are capable of being distinguished from each other, the first projection image being based on an analysis result provided by a computer for digital image data of the sample, the second projection image being based on an input operation performed by a user and including at least input information provided by the user.

A projection unit in accordance with an aspect of the invention is a projection unit for a microscope provided with an objective, a tube lens, and an eyepiece, the projection unit including: an imaging apparatus that acquires digital image data of a sample on the basis of light from the sample; and a projection apparatus that projects first and second projection images onto an image plane on which an optical image of the sample is formed by the tube lens, in a manner such that the first and second projection images are capable of being distinguished from each other, the first projection image being based on an analysis result for the digital image data, the second projection image being based on an input operation performed by a user and including at least input information provided by the user.

An image projection method in accordance with an aspect of the invention is an image projection method be implemented by a microscope system, the image projection method including performing, by the microscope system: acquiring digital image data of a sample; and acquiring information on an input operation performed by a user, the image projection method further including projecting first and second projection images onto an image plane on which an optical image of the sample is formed on the basis of light from the sample, in a manner such that the first and second projection images are capable of being distinguished from each other, the first projection image being based on an analysis result provided by a computer for the digital image data, the second projection image being based on the input operation and including at least input information provided by the user.

BRIEF DESCRIPTION OF THE DRAWINGS

FIG. 2 illustrates the configuration of a computer 20;

FIG. 8 illustrates the configuration of a neural network;

FIG. 9 illustrates the configuration of a microscope system 2;

FIG. 10 illustrates the configuration of a diagnosis assistance system that includes a microscope system 3 and external browsing systems 300;

DETAILED DESCRIPTION OF THE PREFERRED EMBODIMENTS

A system to which the WSI technique is applied (hereinafter, "WSI system") is required to have high performance. In particular, for example, as information on colors or light and shade is highly important in a pathological diagnosis, the WSI system may be required to have a high color reproducibility and a wide dynamic range. Hence, the devices forming the WSI system need to have high performance and thus cannot help being expensive, and as a result, only limited users can introduce the WSI system.

In view of the abovementioned facts, there is demand for a new technique for reducing the burden on a pathologist by assisting in a pathological diagnosis performed by the pathologist on the basis of optical images (analog images) acquired by an optical microscope.

Considering such circumstances, an embodiment of the present invention will be described hereinafter.

First Embodiment

Figure 1:
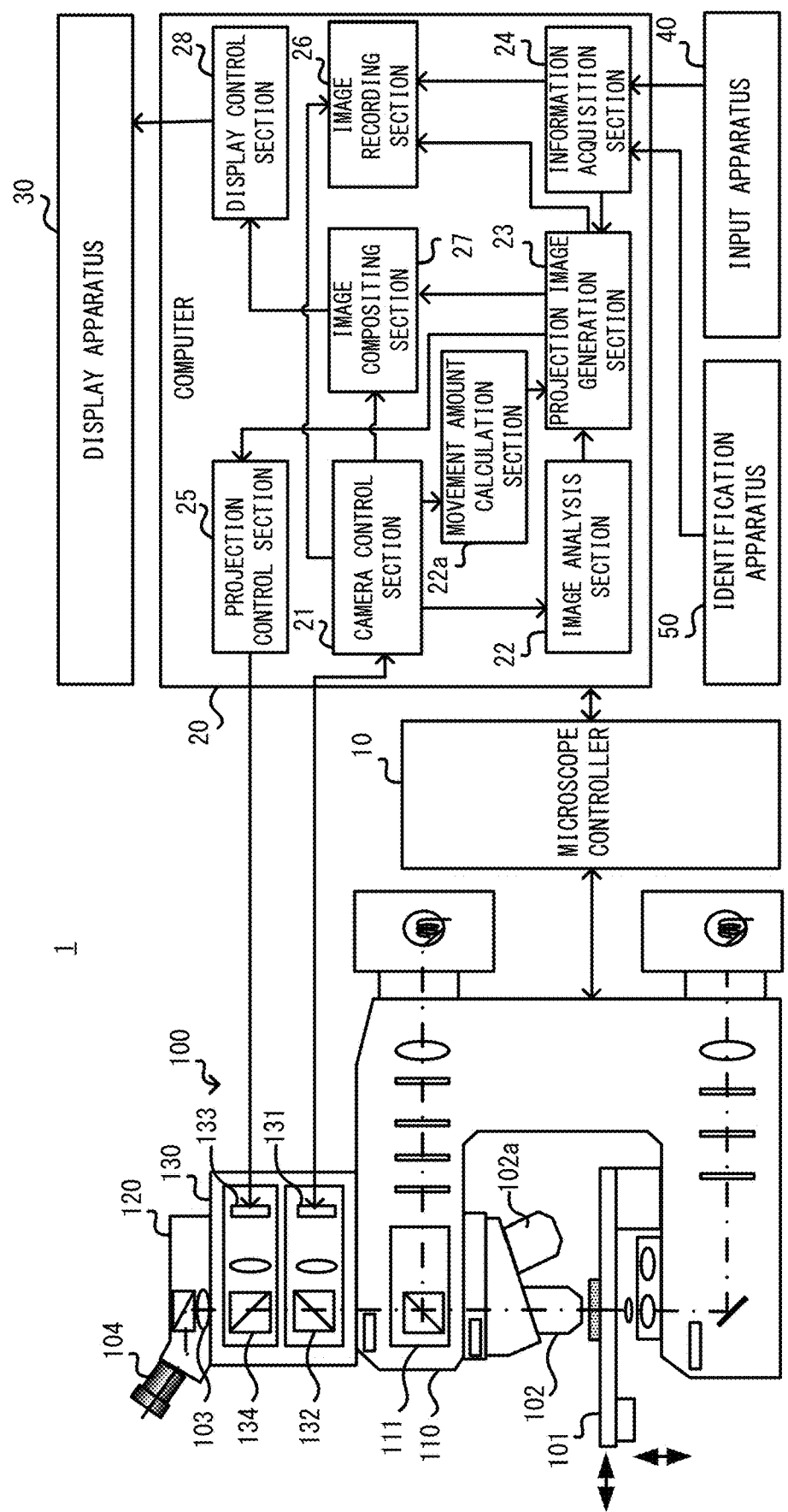
FIG. 1 illustrates the configuration of a microscope system 1.

FIG. 1 illustrates the configuration of a microscope system 1 in accordance with the present embodiment. FIG. 2 illustrates the configuration of a computer 20. The microscope system 1 is used by a pathologist in a pathological diagnosis and includes at least an objective 102, a tube lens 103, an eyepiece 104, and a projection apparatus 133.

Using the projection apparatus 133, the microscope system 1 projects two types of projection images onto an image plane on which an optical image of a sample is formed by the objective 102 and the tube lens 103. More specifically, the two types of projection images are a first projection image based on an analysis result provided by the computer and a projection image based on an input operation performed by users of the microscope system 1, including the pathologist. Thus, the pathologist will view an image obtained by superimposing the projection images onto the optical image. Accordingly, the microscope system 1 can provide the pathologist observing a sample through the eyepiece 104 with various information for assistance in the pathological diagnosis.

The following describes a specific example of the configuration of the microscope system 1 in detail by referring to FIGS. 1 and 2. As depicted in FIG. 1, the microscope system 1 includes a microscope 100, a microscope controller 10, a computer 20, a display apparatus 30, an input apparatus 40, and an identification apparatus 50.

For example, the microscope 100 may be an upright microscope and include a microscope body 110, a lens tube 120, and an intermediate lens tube 130. Alternatively, the microscope 100 may be an inverted microscope.

The microscope body 110 includes a stage 101 on which a sample is placed, objectives (objectives 102 and 102*a*) that guide light from the sample to the eyepiece 104, an epi-illumination optical system, and a transmitted illumination optical system. The stage 101 may be a manual stage or a motorized stage. A revolver is desirably mounted with a plurality of objectives having different magnifications. For example, the objective 102 may have a 4-fold magnification, and the objective 102*a* may have a 20-fold magnification. The microscope body 110 may include at least either an epi-illumination optical system or a transmitted illumination optical system.

The microscope body 110 further includes a turret 111 for switching a microscopy. For example, the turret 111 may have a fluorescence cube to be used in a fluorescent observation method or a half mirror to be used in a bright field observation method disposed thereon. In addition, the microscope body 110 may be provided with an optical element to be used in a certain microscopy, in a manner such that this optical element can be inserted/removed into/from a light path. Specifically, for example, the microscope body 110 may include a DIC prism, polarizer, or analyzer to be used in a differential-interface-contrast observation method.

The lens tube 120 is a monocular or binocular lens tube mounted with the eyepiece 104. The tube lens 103 is provided within the lens tube 120. The tube lens 103 is disposed on a light path between the objective 102 and the eyepiece 104. On the basis of light from a sample, the tube lens 103 forms an optical image of the sample on an image plane between the eyepiece 104 and the tube lens 103. The tube lens 103 also forms projection images on the image plane on the basis of light from the projection apparatus 133 (descriptions will be given of the projection images hereinafter). Thus, the projection images are superimposed onto the optical image on the image plane.

The intermediate lens tube 130 is provided between the microscope body 110 and the lens tube 120. The intermediate lens tube 130 includes an image sensor 131, a light deflection element 132, the projection apparatus 133, and a light deflection element 134.

The image sensor 131 is an example of a photodetector that detects light from a sample. The image sensor 131 is a two-dimensional image sensor, e.g., CCD image sensor, CMOS image sensor. The image sensor 131 detects light from a sample and generates digital image data thereof on the basis of the detection result.

The light deflection element 132 is an example of a first light deflection element that deflects light from a sample toward the image sensor 131. For example, the light deflection element 132 may be a beam splitter such as a half mirror. A variable beam splitter capable of varying transmittance and reflectance may be used for the light deflection element 132. The light deflection element 132 is disposed on the light path between the eyepiece 104 and the objective 102. Thus, the image sensor 131 can acquire a digital image of the sample as seen in the same direction as a visual observation.

In accordance with an instruction from the computer 20, the projection apparatus 133 projects first and second projection images onto the image plane in a manner such that these projection images can be distinguished from each other (descriptions will be give of the first and second projection images hereinafter). For example, the projection apparatus 133 may be a projector using a liquid crystal device, a projector using a digital mirror device, or a projector using an LCOS.

The light deflection element 134 is an example of a second light deflection element that deflects light emitted from the projection apparatus 133 toward the image plane. For example, the light deflection element 134 may be a beam splitter such as a half mirror. A variable beam splitter capable of varying transmittance and reflectance may be used for the light deflection element 134. A dichroic mirror may be used for the light deflection element 134. The light deflection element 134 is disposed on the light path between the image plane and the light deflection element 132. Thus, light from the projection apparatus 133 can be prevented from being incident on the image sensor 131.

The microscope controller 10 controls the microscope 100, in particular the microscope body 110. The microscope controller 10 is connected to the computer 20 and the microscope 100 and controls the microscope 100 in accordance with an instruction from the computer 20.

For example, the display apparatus 30 may be a liquid crystal display, an organic electroluminescence (OLED) display, or a cathode ray tube (CRT) display. The input apparatus 40 outputs, to the computer 20, an operation signal that corresponds to an input operation performed by the user. The input apparatus 40 is, for example, a keyboard and may include a mouse, a joystick, or a touch panel.

The identification apparatus 50 acquires identification information assigned to a sample. The identification information includes at least information identifying the sample. The identification information may include information pertaining to a method of analyzing the sample. For example, the identification apparatus 50 may be a bar code reader, an RFID reader, or a QR Code® reader.

The computer 20 controls the entirety of the microscope system 1. The computer 20 is connected to the microscope 100, the microscope controller 10, the display apparatus 30, the input apparatus 40, and the identification apparatus 50. As depicted in FIG. 1, the computer 20 includes a camera control section 21, an image analysis section 22, a movement amount calculation section 22*a*, a projection image generation section 23, an information acquisition section 24, a projection control section 25, an image recording section 26, an image compositing section 27, a display control section 28 as components pertaining primarily to the controlling of the projection apparatus 133.

The camera control section 21 acquires digital image data of a sample by controlling the image sensor 131. The digital image data acquired by the camera control section 21 is output to the image analysis section 22, the movement amount calculation section 22a, the image recording section 26, and the image compositing section 27.

The image analysis section 22 analyzes the digital image data acquired by the camera control section 21 and outputs an analysis result to the projection image generation section 23. Details of the analysis process performed by the image analysis section 22 are not particularly limited. For example, the image analysis section 22 may classify one or more structures seen in a digital image represented by the digital image data into one or more classes and output an analysis result including information specifying the position of a structure classified into at least one class of the one or more classes. More specifically, the image analysis section 22 may classify the cells seen in the digital image and output an analysis result including information specifying the outline of a certain cell and information specifying the outline of the nucleus of the certain cell.

The movement amount calculation section 22a analyzes the digital image data acquired by the camera control section 21 so as to calculate the movement amount of the stage 101. In particular, the movement amount of the stage 101 is calculated by comparing pieces of digital image data acquired at different times. The movement amount calculated by the movement amount calculation section 22a is output to the projection image generation section 23.

The projection image generation section 23 generates first projection image data and second projection image data. The first projection image represented by the first projection image data is based on an analysis result provided by the computer 20 for the digital image data of the sample. The second projection image represented by the second projection image data is based on an input operation performed by the user. The first and second projection images generated by the projection image generation section 23 are output to the projection control section 25, the image recording section 26, and the image compositing section 27.

The projection image generation section 23 desirably generates first projection image data and second projection image data such that the display formats of first and second projection images are different from each other. For example, the display formats may include the colors of the images or the forms of lines forming the images. The forms of lines include the colors, types, widths, and the like of the lines.

The projection image generation section 23 generates first projection image data on the basis of an analysis result output from the image analysis section 22. For example, when the analysis result includes information specifying the position of a structure classified into at least one class, the first projection image data generated by the projection image generation section 23 may represent a first projection image including a graphic pattern specifying the position of the structure classed into at least one class. When the analysis result includes information specifying the outline of a certain cell and information specifying the outline of the nucleus of the certain cell, the first projection image data will represent a first projection image including a closed curve to be superimposed onto the outline of the certain cell and a closed curve to be superimposed onto the outline of the nucleus of the certain cell. The closed curve for specifying the outline of the certain cell and the closed curve for specifying the outline of the nucleus may have different colors.

The projection image generation section 23 generates second projection image data on the basis of at least operation information acquired by the information acquisition section 24 (descriptions will be given of the information acquisition section 24 hereinafter). For example, when the operation information is obtained through an operation performed by the user to designate a region to which attention is to be given, the second projection image data generated by the projection image generation section 23 may represent a second projection image including a graphic pattern indicating the region to which attention is to be given (hereinafter, "ROI") designated by the user. The graphic pattern indicating the ROI is, for example, a closed curve to be superimposed onto the outline of the ROI. When the operation information is obtained through an operation performed by the user to input comments, the second projection image data generated by the projection image generation section 23 will represent a second projection image including the comments input by the user.

The projection image generation section 23 may generate second projection image data on the basis of an input operation and the movement amount of the stage 101 obtained by the movement amount calculation section 22a. This will be effective especially when the stage 101 moves after the information acquisition section 24 has acquired operation information. In this way, in accordance with the movement amount of the stage 101, the projection image generation section 23 can change the position on the image plane at which a graphic pattern indicating the ROI included in the second projection image is located, without the user designating an ROI again.

The projection image generation section 23 may generate second projection image data on the basis of an input operation and the magnification of an optical image formed on the image plane. This will be effective especially when the magnification of the optical image is changed after the information acquisition section 24 has acquired operation information. In this way, in accordance with the magnification of the optical image, the projection image generation section 23 can change the size that the graphic pattern included in the second projection image has on the image plane, without the user designating an ROI again.

The information acquisition section 24 acquires information from an apparatus outside the computer 20. In particular, the information acquisition section 24 acquires operation information of the user on the basis of an operation signal from the input apparatus 40. The information acquisition section 24 acquires identification information from the identification apparatus 50. The operation information of the user is generated by the user operating the input apparatus 40 in order to display information on the image plane.

The projection control section 25 controls projection of first and second projection images onto the image plane by controlling the projection apparatus 133. The projection control section 25 may control the projection apparatus 133 so as to make the projection periods of the first and second projection images different from each other. In particular, for example, the projection control section 25 may adjust the projection periods such that the first projection image is periodically projected and the second projection image is projected all the time. The projection control section 25 may control the projection apparatus 133 in accordance with the setting of the microscope system 1. Specifically, the projection control section 25 may determine, for each of the first and second projection images, whether to project the projection image onto the image plane in accordance with the setting of the microscope system 1, or may control the projection apparatus 133 such that the projection apparatus 133 projects the first and second projection images onto the image plane when the microscope system 1 is in a predetermined setting. Thus, for each of the first and second projection images, the microscope system 1 can make a change as to whether to project the projection image onto the image plane in accordance with the setting.

The image recording section 26 records digital image data, first projection image data, and second projection image data. In particular, the image recording section 26 records, in a different region from the digital image data, the first projection image data and the second projection image data in association with the digital image data. Thus, the digital image data, the first projection image data, and the second projection image data that are associated with each other can be individually read according to need. In addition, the image recording section 26 may acquire identification information assigned to the sample via the identification apparatus 50 and the information acquisition section 24, and record the acquired identification information in association with digital image data. The image recording section 26 may also record digital image data, first projection image data, and second projection image data when detecting input of a record instruction from the user.

The image compositing section 27 generates image data for a composite image obtained by compositing a digital image, a first projection image, and a second projection image on the basis of digital image data, first projection image data, and second projection image data and outputs the generated image data to the display control section 28.

The display control section 28 displays a composite image on the display apparatus 30 on the basis of composite image data output from the image compositing section 27.

Alternatively, the display control section 28 may display a digital image alone on the display apparatus 30 on the basis of digital image data.

The computer 20 may be a general-purpose or special-purpose apparatus. For example, the computer 20 may have, but is not particularly limited to, a physical configuration such as that depicted in FIG. 2. Specifically, the computer 20 may include a processor 20a, a memory 20b, an auxiliary storage apparatus 20c, an input-output interface 20d, a medium drive apparatus 20e, and a communication control apparatus 20f, all of which may be connected to each other by a bus 20g.

For example, the processor 20a may be any processing circuit that includes a central processing unit (CPU). The processor 20a may implement the above-described components pertaining to the controlling of the projection apparatus 133 (e.g., camera control section 21, image analysis section 22, projection image generation section 23) by performing programmed processes by executing programs stored in the memory 20b, the auxiliary storage apparatus 20c, and a storage medium 20h. The processor 20a may be configured using a special-purpose processor such as an ASIC or an FPGA.

The memory 20b is a working memory for the processor 20a. For example, the memory 20b may be any semiconductor memory such as a random access memory (RAM). The auxiliary storage apparatus 20c is a nonvolatile memory such as an erasable programmable ROM (EPROM) or a hard disc drive. The input-output interface 20d communicates information with an external apparatus (microscope 100, microscope controller 10, display apparatus 30, input apparatus 40, identification apparatus 50).

The medium drive apparatus 20e can output data stored in the memory 20b or the auxiliary storage apparatus 20c to the storage medium 20h and read a program, data, and the like from the storage medium 20h. The storage medium 20h may be any portable recording medium. For example, the storage medium 20h may include an SD card, a universal serial bus (USB) flash memory, a compact disc (CD), and a digital versatile disc (DVD).

The communication control apparatus 20f inputs/outputs information to/from a network. For example, a network interface card (NIC) or a wireless local area network (wireless LAN) card may be used as the communication control apparatus 20f. The bus 20g connects the processor 20a, the memory 20b, the auxiliary storage apparatus 20c, and the like to each other in a manner such that data can be communicated therebetween.

Figure 3:
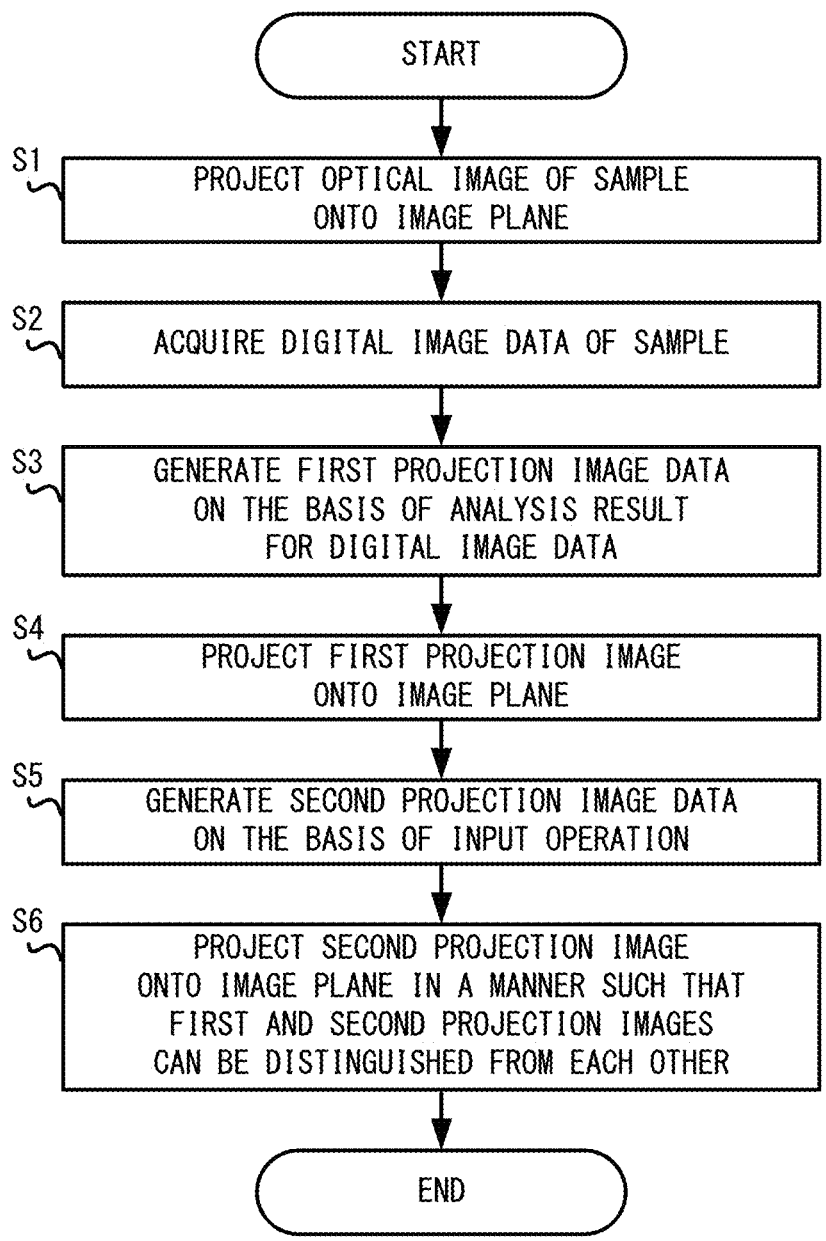
FIG. 3 is a flowchart of an image projection process performed by a microscope system 1.

The microscope system 1 configured as described above performs an image projection process indicated in FIG. 3. FIG. 3 is a flowchart of an image projection process performed by the microscope system 1. The following describes an image projection method implemented by the microscope system 1 by referring to FIG. 3.

The microscope system 1 projects an optical image of a sample onto an image plane (step S1). In this example, the tube lens 103 focuses light the objective 102 receives from the sample onto the image plane, thereby forming an optical image of the sample.

In addition, the microscope system 1 acquires digital image data of the sample (step S2). In this example, the light deflection element 132 deflects a portion of the light the objective 102 receives from the sample toward the image sensor 131. The image sensor 131 generates the digital image data by capturing an image of the sample on the basis of the light deflected by the light deflection element 132.

Afterward, the microscope system 1 generates first projection image data on the basis of an analysis result for the digital image data (step S3). In this example, the image analysis section 22, which has acquired the digital image data via the camera control section 21, performs an analysis process, and the projection image generation section 23 generates first projection image data on the basis of the analysis result.

Upon the first projection image data being generated, the microscope system 1 projects a first projection image onto the image plane (step S4). In this example, the projection control section 25 controls the projection apparatus 133 on the basis of the first projection image data, thereby causing the projection apparatus 133 to project the first projection image onto the image plane. Thus, the first projection image is superimposed onto the optical image of the sample.

Furthermore, the microscope system 1 generates second projection image data on the basis of an input operation performed by the user (step S5). In this example, the projection image generation section 23 generates second projection image data on the basis of operation information acquired via the input apparatus 40 and the information acquisition section 24.

Finally, the microscope system 1 projects the second projection image onto the image plane in a manner such that the first and second projection images can be distinguished from each other (step S6). In this example, the projection control section 25 controls the projection apparatus 133 on the basis of the second projection image data, thereby causing the projection apparatus 133 to project the second projection image onto the image plane in a manner such that the first and second projection images can be distinguished from each other. More specifically, when, for example, the display formats of the first and second projection images are different, the projection apparatus 133 projects the first and second projection images in a manner such that these images can be distinguished from each other according to the difference in display format. When, for example, the display formats of the first and second projection images are the same, the projection apparatus 133 makes the projection periods of the first and second projection images different from each other, so as to project the first and second projection images in a manner such that these images can be distinguished from each other.

The microscope system 1 is such that an image analysis result provided by the computer and information added by the user through an input operation are displayed on an optical image. Thus, during a pathological diagnosis based on an optical image of a sample, the pathologist can acquire various information for assisting in the diagnosis without taking the eye from the eyepiece. Hence, the microscope system 1 can reduce the task burden on the pathologist. Among other things, the displaying of an image analysis result provided by the computer allows the pathologist to acquire various information that can be a basis for judgment in the pathological diagnosis. Moreover, as an image based on an input operation performed by a user is displayed, the pathologist can receive advice from, for example, another experienced pathologist in real time. Accordingly, the microscope system 1 can assist in a pathological diagnosis based on optical images.

Furthermore, the microscope system 1 assists in a pathological diagnosis by displaying additional information on an optical image. Thus, expensive devices are not necessary, unlike WSI systems which perform pathological diagnoses based on digital images. Hence, the microscope system 1 can reduce the burden on the pathologist while avoiding substantial rise in device cost. Meanwhile, when a pathological diagnosis is performed using a WSI system, whole slide images (WSIs) need to be created in advance; and in the case of the microscope system 1, no advance preparations need to be made, and diagnosis tasks can be started immediately.

Figure 4:
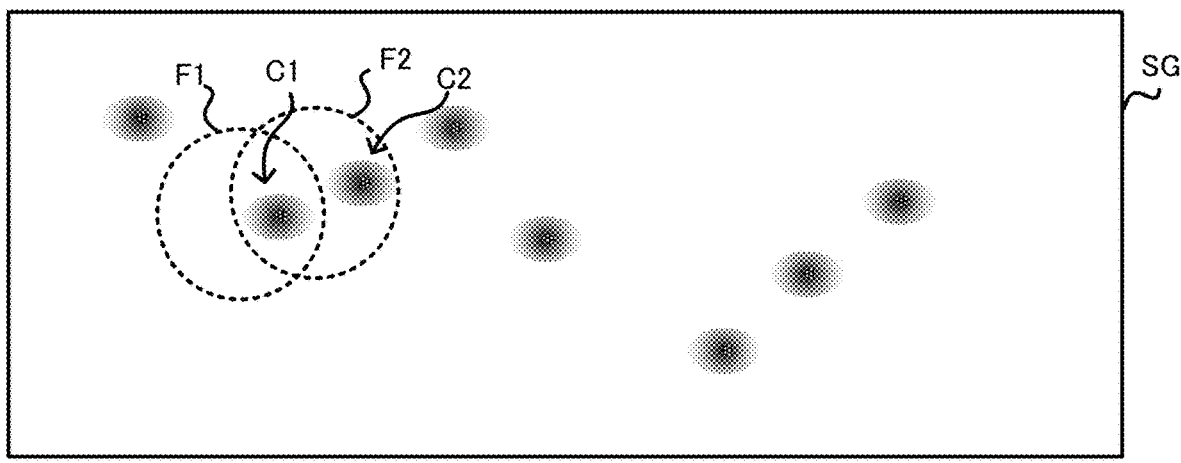
FIG. 4 exemplifies cell distribution.
Figure 5:
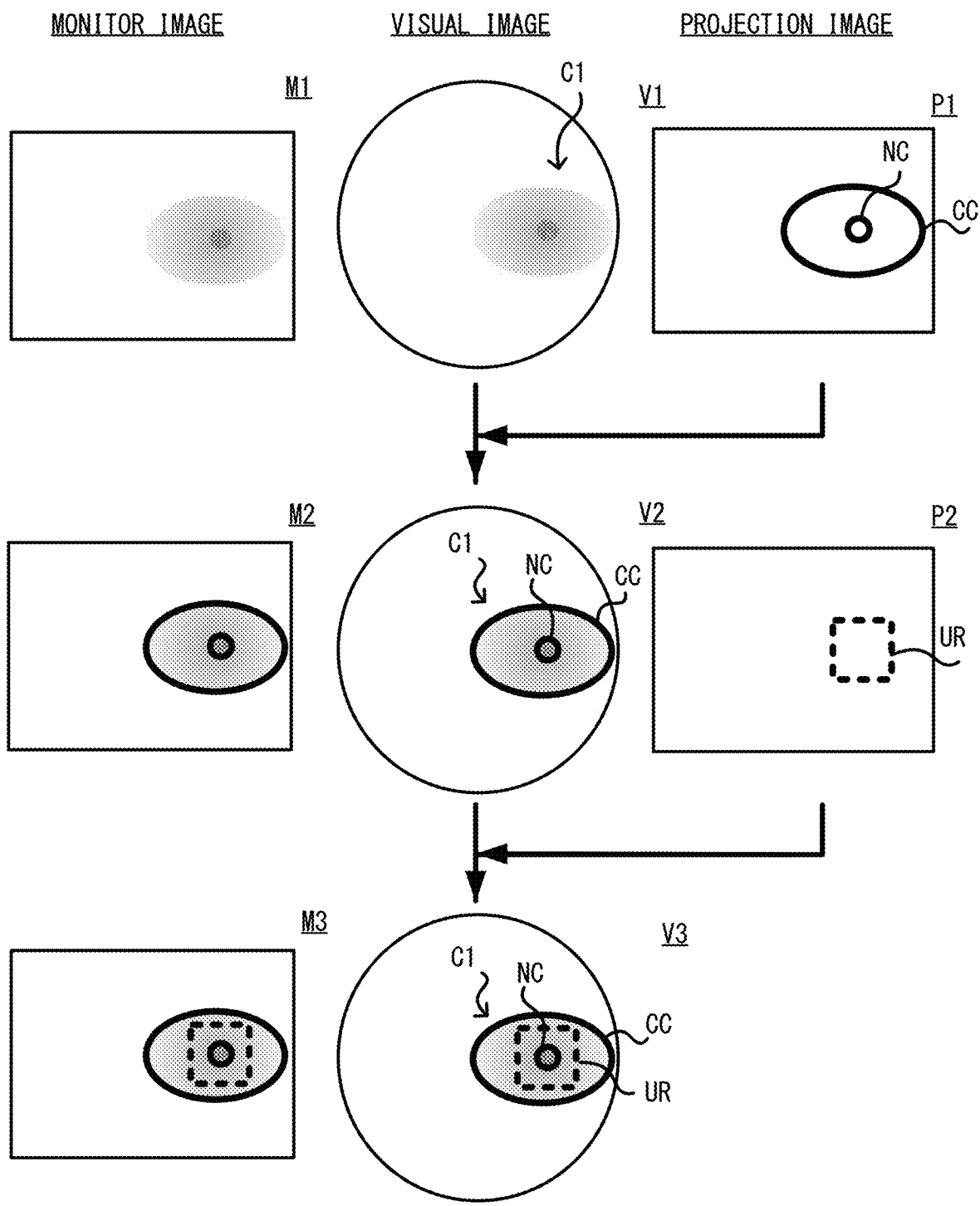
FIG. 5 illustrates an example of observation performed using a microscope system 1.
Figure 6:
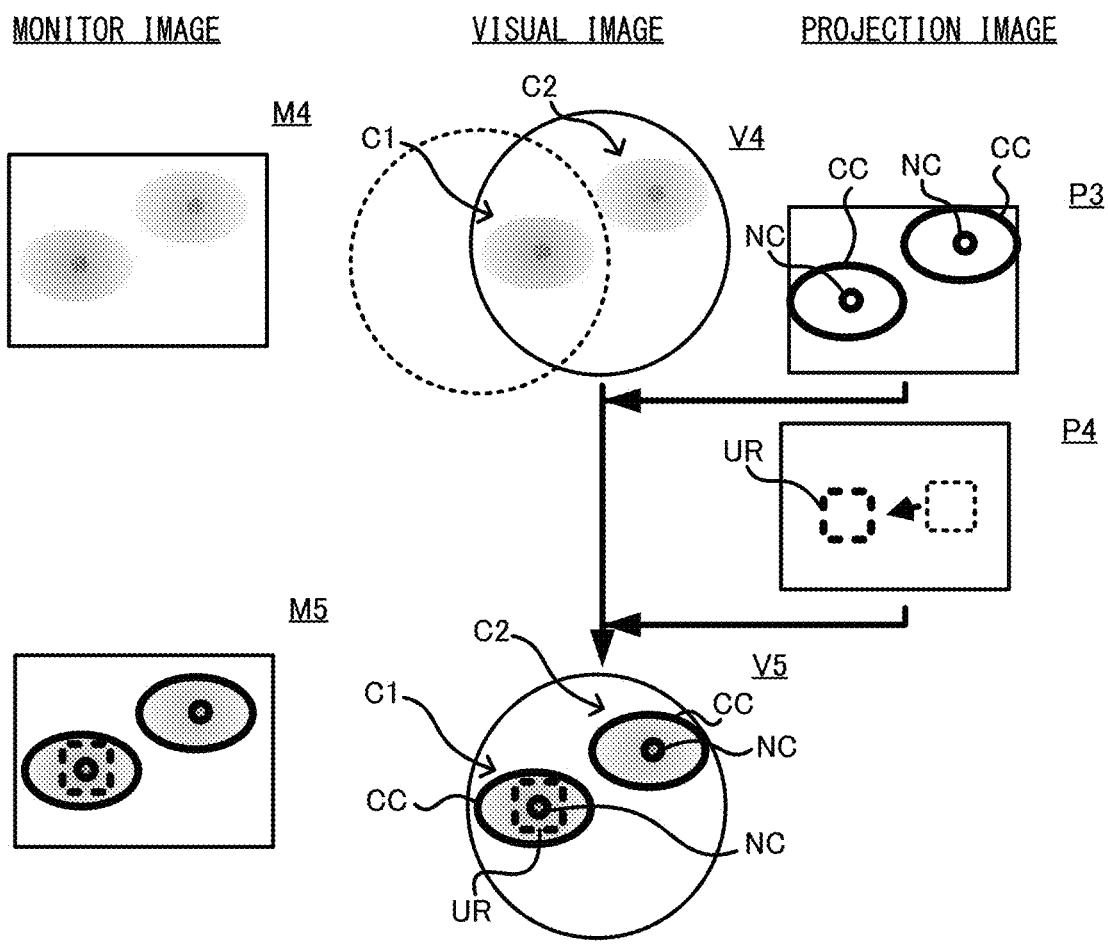
FIG. 6 illustrates another example of observation performed using a microscope system 1.
Figure 7:
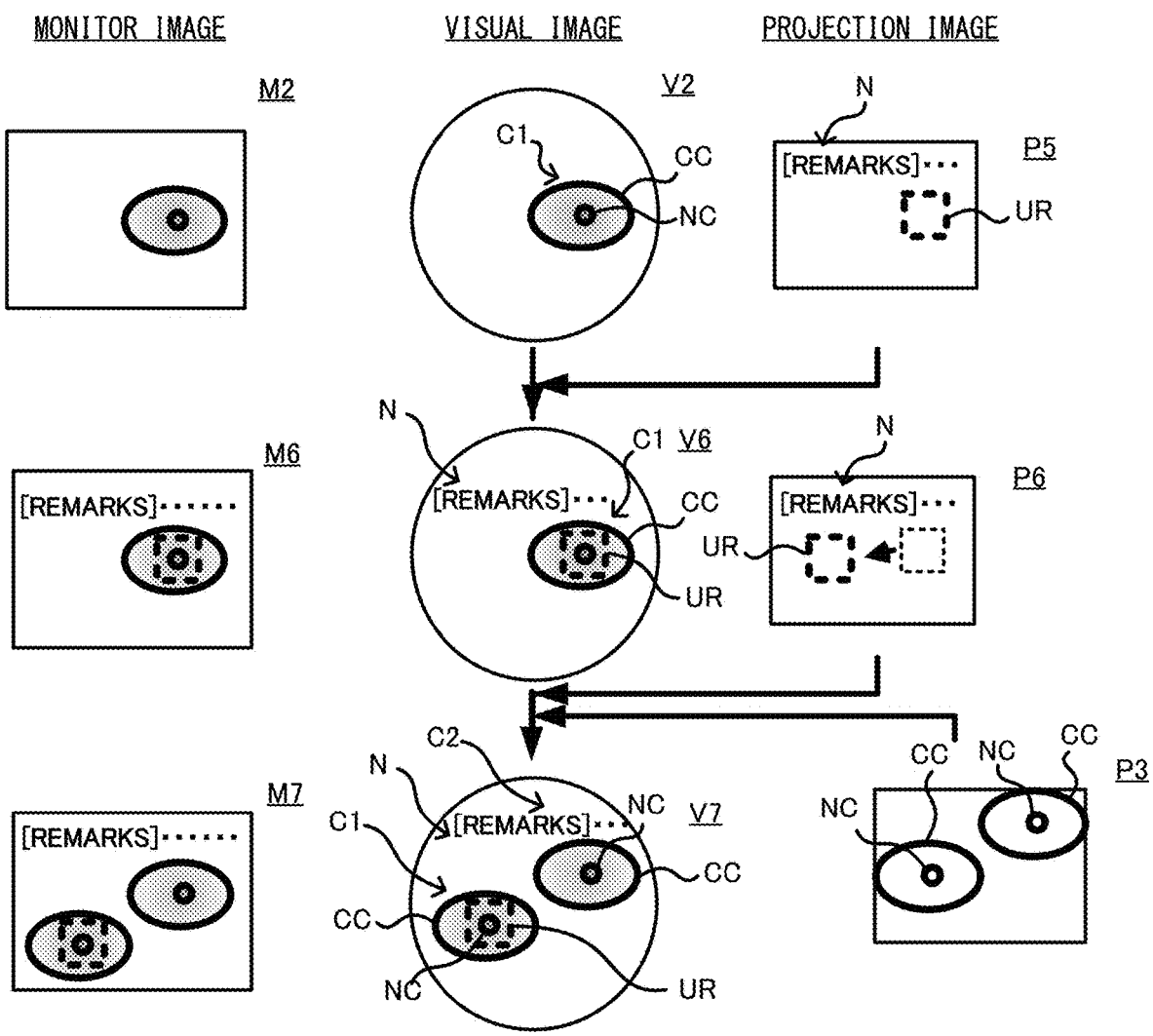
FIG. 7 illustrates still another example of observation performed using a microscope system 1.

FIG. 4 exemplifies cell distribution on slide glass SG. FIGS. 5-7 illustrate examples of observation performed using the microscope system 1. By referring to FIGS. 4-7, the following specifically describes how an observation is performed using the microscope system 1 executing the image projection process depicted in FIG. 3.

First, with reference to FIG. 5, descriptions are given of a situation in which an observation is performed on the slide glass SG depicted in FIG. 4 with a field of view F1 fixed for the microscope system 1.

Upon the observation using the microscope system 1 being started, the pathologist can observe an image V1 showing a cell C1 through the eyepiece 104. The image V1 is an optical image formed on the image plane and corresponding to the field of view F1. In this case, the display apparatus 30 displays an image M1 corresponding to the image V1 on the basis of digital image data generated by the image sensor 131.

Note that an image observed by the pathologist using the eyepiece 104 is hereinafter referred to as a visual image, and an image displayed on the display apparatus 30 is hereinafter referred to as a monitor image.

Then, the computer 20 analyzes the digital image data and specifies the outline of the cell C1 and the outline of the nucleus of the cell C1, and in response to this, a projection image P1, i.e., a first projection image, is projected onto the image plane. A mark CC included in the projection image P1 indicates the outline of the cell, and a mark NC included therein indicates the outline of the nucleus of the cell. Accordingly, the pathologist observes an image V2 obtained by superimposing the projection image P1 onto the image V1. In this case, the display apparatus 30 displays an image M2 obtained by compositing the image M1 and the projection image P1.

Finally, the user of the microscope system 1 designates an ROI by using the input apparatus 40, and in response to this, a projection image P2, i.e., a second projection image, is projected onto the image plane. The user is, for example, an experienced assistant observing the monitor image, and a mark UR included in the projection image P2 indicates the ROI. Accordingly, the pathologist can observe an image V3 obtained by superimposing the projection image P2 onto the image V2. In this case, the display apparatus 30 displays an image M3 obtained by compositing the image M2 and the projection image P2.

In the example depicted in FIG. 5, the outline of the cell C1 and the outline of the nucleus are highlighted by the first projection image. Hence, the pathologist can give a diagnosis with the presence of the cell C1 reliably grasped, i.e., without failing to find the presence of thereof. Meanwhile, the region of interest designated by the experienced assistant is indicated by the second projection image. Hence, the pathologist can give a diagnosis by carefully observing a region to which attention is to be given especially.

Next, with reference to FIG. 6, descriptions are given of a situation in which an observation is performed on the slide glass SG depicted in FIG. 4 while shifting the field of view of the microscope system 1 from a field of view F1 to a field of view F2.

The pathologist, who is observing the image V3 depicted in FIG. 5, may shift the field of view of the microscope system 1 from the field of view F1 to the field of view F2 so as to observe an image V4 showing cells C1 and C2. The image V4 is an optical image formed on the image plane and corresponding to the field of view F2. In this case, the display apparatus 30 displays an image M4 corresponding to the image V4 on the basis of digital image data generated by the image sensor 131.

Then, the computer 20 analyzes the digital image data and specifies the outlines of the cells C1 and C2 and the outlines of the nuclei of the cells C1 and C2, and in response to this, a projection image P3, i.e., a first projection image, is projected onto the image plane. In addition, the movement amount of the stage 101 is calculated on the basis of a change in the position of the cell C1 within the digital image, and a projection image P4 resulting from the movement of the mark UR in the projection image P2 by a distance corresponding to the movement amount is projected onto the image plane. Accordingly, the pathologist observes an image V5 obtained by superimposing the projection images P3 and P4 onto the image V4. In this case, the display apparatus 30 displays an image M5 obtained by compositing the image M4 and the projection images P3 and P4.

In the example depicted in FIG. 6, a mark UR included in a second projection image moves in accordance with the movement amount of the stage 101. Thus, the mark UR follows an ROI designated by the user, and hence the user does not need to designate the ROI again after the stage 101 moves. Accordingly, the pathologist can accurately grasp the region to which attention is to be given, irrespective of movement of the stage 101.

In addition, with reference to FIG. 7, descriptions are given of a situation in which an observation is performed on the slide glass SG depicted in FIG. 4 while shifting the field of view of the microscope system 1 from a field of view F1 to a field of view F2. FIG. 7 is different from FIG. 6 in that the pathologist inputs observation remarks in the middle of the pathological diagnosis.

A projection image P5, i.e., a second projection image, will be projected onto the image plane when the user of the microscope system 1 designates an ROI and inputs observation remarks by using the input apparatus 40 while an image V2 showing a cell C1 is formed on the image plane. For example, the user may be a pathologist looking through the eyepiece 104. A mark UR included in the projection image P5 indicates the ROI, and an annotation N included in the projection image P5 is the pathologist's remarks on the ROI. Accordingly, the pathologist can observe an image V6 obtained by superimposing the projection image P5 onto the image V2. In this case, the display apparatus 30 displays an image M6 obtained by compositing the image M2 and the projection image P5.

The pathologist, who is observing the image V6, may shift the field of view of the microscope system 1 from the field of view F1 to the field of view F2 so as to observe an image V7 showing the cells C1 and C2. The image V7 is obtained by superimposing the projection images P3 and P6 onto the image V4, i.e., an optical image corresponding to the field of view F2. The projection image P6 is obtained by moving the mark UR included in the projection image P5 by a distance corresponding to the movement amount and includes the annotation N at the same position as in the projection image P5. In this case, the display apparatus 30 displays an image M7.

In the example depicted in FIG. 7, marks included in the second projection image that are to be moved together with the stage 101 and those that are not to be moved with the stage 101 are separately managed. Hence, the mark UR follows the ROI designated by the user, while the annotation N indicating remarks are fixed at a predetermined position. Accordingly, remarks that should be displayed all the time can be prevented from coming to be no longer displayed due to movement of the stage 101.

In the examples depicted in FIGS. 5-7, the first and second projection images are displayed by means of different line types (solid line and dashed line). However, the first and second projection images can be displayed using, for example, different colors so that these images can be distinguished from each other.

The image analysis section 22 of the microscope system 1 may analyze digital image data through an image recognition process based on a predetermined algorithm or by using a trained neural network.

Parameters for the trained neural network may be generated by training a neural network by means of a different apparatus from the microscope system. 1, and the computer 20 may download and apply the generated parameters to the image analysis section 22.

FIG. 8 illustrates the configuration of a neural network NN. The neural network NN includes an input layer, a plurality of intermediate layers, and an output layer. Output data D2 output from the output layer by inputting input data D1 to the input layer is compared with correct answer data D3. Then, learning is performed using an error back propagation method so as to update the parameters for the neural network NN. Note that a set of input data D1 and correct answer data D3 is training data for supervised learning.

Second Embodiment

FIG. 9 illustrates the configuration of a microscope system 2 in accordance with the present embodiment. The microscope system 2 is different from the microscope system 1 in that the former includes a microscope 200 in place of the microscope 100. The microscope 200 includes a projection unit 140 between the microscope body 110 and the lens tube 120.

The projection unit 140, which is a projection unit for a microscope provided with the objective 102, the tube lens 103, and the eyepiece 104, includes the intermediate lens tube 130. Thus, the projection unit 140 includes the image sensor 131, i.e., an example of an imaging apparatus that acquires digital image data of a sample on the basis of light therefrom, and the projection apparatus 133 that projects first and second projection images onto an image plane on which an optical image is formed.

The projection unit 140 further includes a camera control section 141, an image analysis section 142, a movement amount calculation section 142a, a projection image generation section 143, an information acquisition section 144, and a projection control section 145.

The camera control section 141, the image analysis section 142, the movement amount calculation section 142a, the projection image generation section 143, and the projection control section 145 are respectively similar to the camera control section 21, the image analysis section 22, the movement amount calculation section 22a, the projection image generation section 23, and the projection control section 25. Accordingly, detailed descriptions thereof are omitted herein.

The information acquisition section 144 acquires operation information of the user on the basis of an operation signal acquired via the computer 20 from the input apparatus 40. The information acquisition section 144 acquires identification information from the identification apparatus 50 via the computer 20.

In the present embodiment, similar effects to the microscope system 1 can be attained by simply attaching the projection unit 140 to an existing microscope. Accordingly, the projection unit 140 and the microscope system 2 allow an exiting microscope system to be easily expanded to assist in a pathological diagnosis based on optical images that is performed by a pathologist.

Third Embodiment

FIG. 10 illustrates the configuration of a diagnosis assistance system that includes a microscope system 3 and external browsing systems 300 in accordance with the present embodiment. The microscope system 3 is different in that this system includes a computer 60 instead of the computer 20.

The microscope system 3 is connected to one or more external browsing systems 300 over the Internet 400. The external browsing systems 300 each include: a computer 310 provided with at least a communication control section 311; an input apparatus 320; and a display apparatus 330.

The Internet 400 is an example of a communication network. For example, the microscope system 3 and the external browsing systems 300 may be connected via a virtual private network (VPN) or a leased line.

The computer 60 is different from the computer 20 in that the former includes a communication control section 29. The communication control section 29 communicates data with the external browsing systems 300.

For example, the communication control section 29 may transmit image data to the external browsing systems 300. Image data transmitted by the communication control section 29 may be, for example, composite image data generated by the image compositing section 27. Digital image data, first projection image data, second projection image data may be individually transmitted. Alternatively, only digital image data may be transmitted. The external browsing system 300 is such that upon receipt of image data, the computer 310 displays an image on the display apparatus 330 on the basis of the image data. For example, the computer 310 may generate composite image data on the basis of digital image data, first projection image data, and second projection image data and may display a composite image on the display apparatus 330 on the basis of the composite image data.

For example, the communication control section 29 may receive operation information input by the user of the external browsing system 300. The projection image generation section 23 may generate second projection image data on the basis of operation information received by the communication control section 29. Using the projection apparatus 133, the microscope system 3 may project a second projection image based on an input operation performed by the user of the external browsing system 300 onto the image plane.

The microscope system 3 can communicate with the external browsing systems 300 connected thereto over the network. Thus, advice can be received from a pathologist in a remote location. Hence, the microscope system 3 can further reduce the burden on pathologists.

Figure 11:
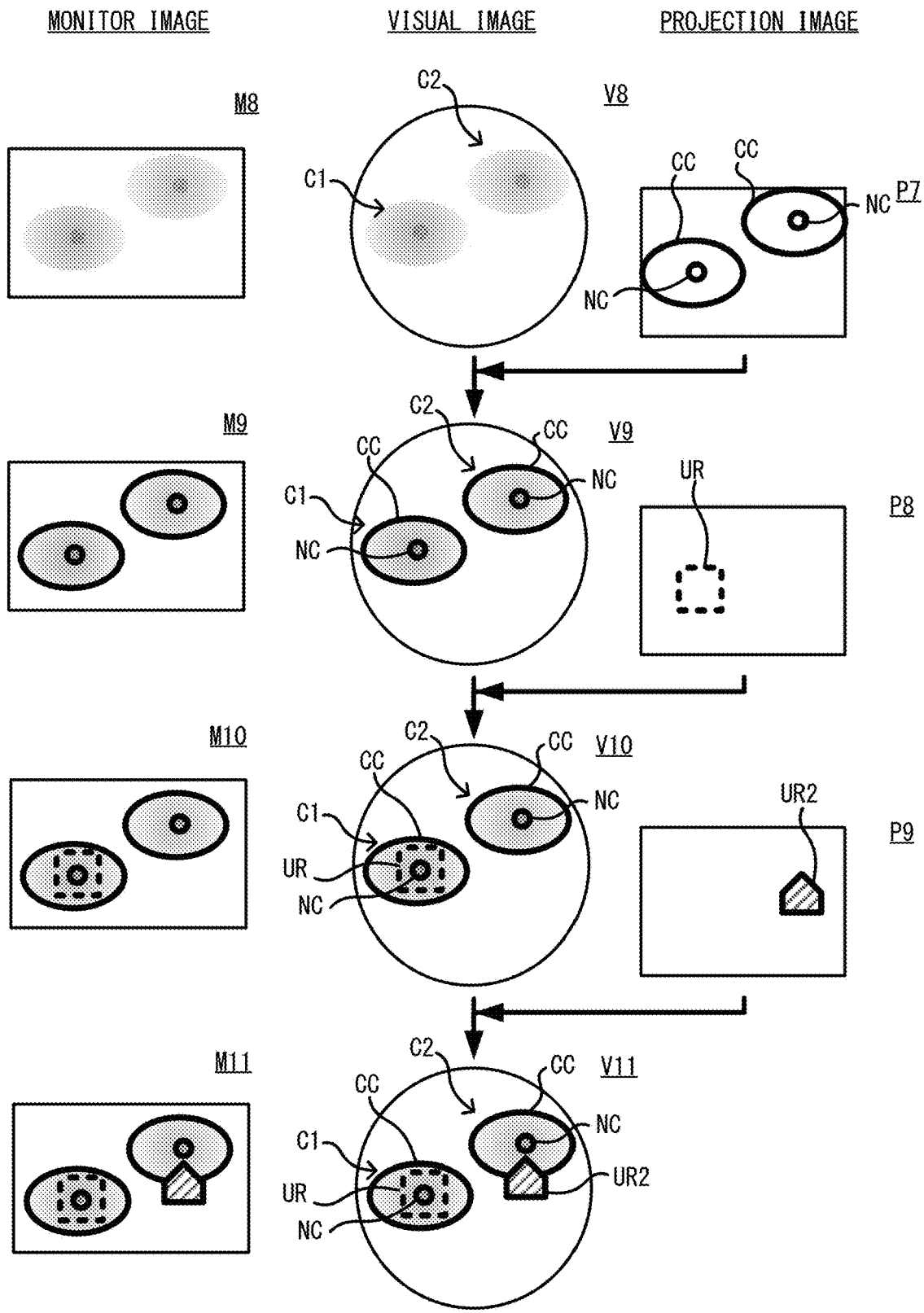
FIG. 11 illustrates an example of observation performed using a microscope system 3.

FIG. 11 illustrates an example of observation performed using the microscope system 3. By referring to FIG. 11, the following specifically describes how an observation is performed using the microscope system 3.

Upon the observation using the microscope system 3 being started, the pathologist can observe an image V8 showing cells C1 and C2 through the eyepiece 104. The image V8 is an optical image formed on the image plane and corresponding to a field of view F2. In this case, the display apparatus 30 and the display apparatuses 330 each display an image M8 corresponding to the image V8 on the basis of digital image data generated by the image sensor 131.

Then, the computer 60 analyzes the digital image data and specifies the outlines of the cells and the outlines of the nuclei of the cells, and in response to this, a projection image P7, i.e., a first projection image, is projected onto the image plane. Marks CC included in the projection image P7 indicate the outlines of the cells, and marks NC included therein indicate the outlines of the nuclei of the cells. Accordingly, the pathologist observes an image V9 obtained by superimposing the projection image P7 onto the image V8. In this case, the display apparatus 30 and the display apparatuses 330 each display an image M9 obtained by compositing the image M8 and the projection image P7.

In addition, the user of the microscope system 3 designates an ROI by using the input apparatus 40, and in response to this, a projection image P8, i.e., a second projection image, is projected onto the image plane. The user is a pathologist looking through the eyepiece 104, and a mark UR included in the projection image P8 indicates the ROI the pathologist has been giving attention to. Accordingly, the pathologist can observe an image V10 obtained by superimposing the projection image P8 onto the image V9. In this case, the display apparatus 30 and the display apparatuses 330 each display an image M10 obtained by compositing the image M9 and the projection image P8.

Afterward, upon realizing from the image M10 displayed on the display apparatus 300 that the pathologist has been giving attention to the cell C1, the user of the external browsing system 300 operates the input apparatus 320 so as to have the pathologist give attention to the cell C2. Accordingly, operation information is transmitted from the external browsing system 300 to the microscope system 3. Upon receipt of the operation information, the microscope system 3 projects a projection image P9, i.e., another second projection image based on the input operation performed by the user of the external browsing system 300, onto the image plane. The projection image P9 includes a mark UR2 for encouraging the cell C2 to have attention given thereto. As a result, the pathologist can observe an image V11 obtained by superimposing the projection image P9 onto the image V10. In this case, the display apparatus 30 and the display apparatuses 330 each display an image M11 obtained by compositing the image M10 and the projection image P9.

In the example depicted in FIG. 11, projection images based on input operations performed by the user of the microscope system 3 and the user of the external browsing system 300 are projected onto the image plane. Hence, the pathological diagnosis can be performed while the users at different locations are communicating with each other.

The embodiments described above indicate specific examples to facilitate understanding of the invention, and the present invention is not limited to these embodiments. Various modifications or changes can be made to the microscope system, the projection unit, and the image projection method without departing from the recitation in the claims.

Figure 12:
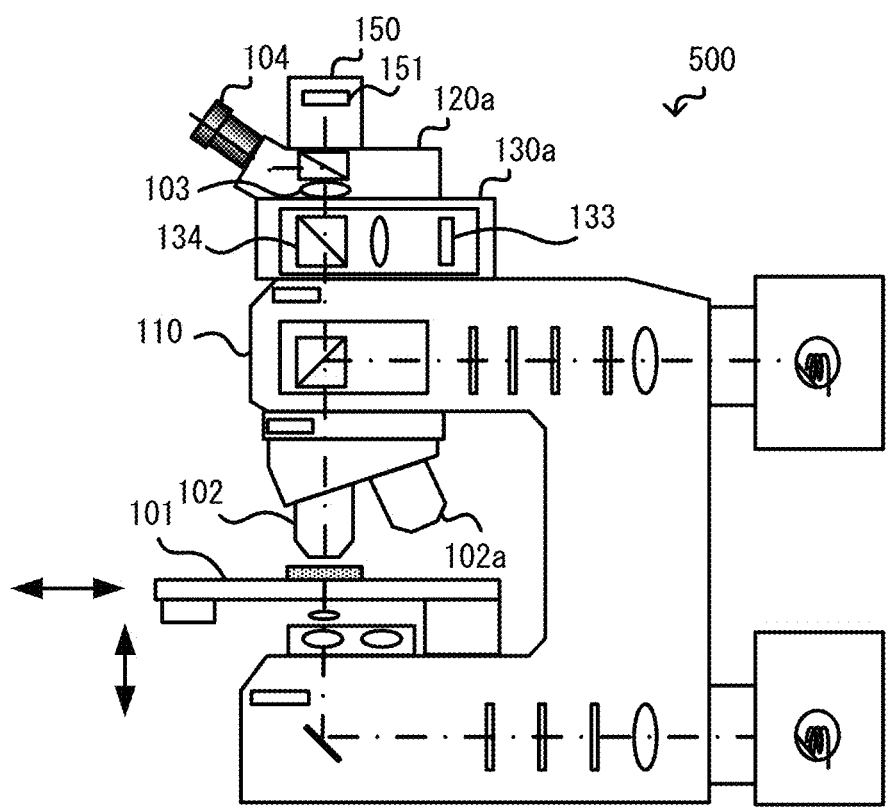
FIG. 12 illustrates the configuration of a microscope 500.

For example, the microscope system 1 may include a microscope 500 depicted in FIG. 12. The above embodiments have been described by referring to the exemplary configurations in which the intermediate lens tube 130 includes the image sensor 131. However, as depicted in FIG. 12, a digital camera 150 attached to a triple-lens tube 120a may be provided with an image sensor 151 for acquiring digital image data to be used for image analysis. In this case, light emitted from the projection apparatus 133 included in an intermediate lens tube 130a will be incident on the image sensor 151. Thus, the digital camera 150 may be controlled such that the light emission period of the projection apparatus 133 and the exposure period of the image sensor 151 have no overlap therebetween. In this way, a projection image can be prevented from being seen on a digital image.

Figure 13:
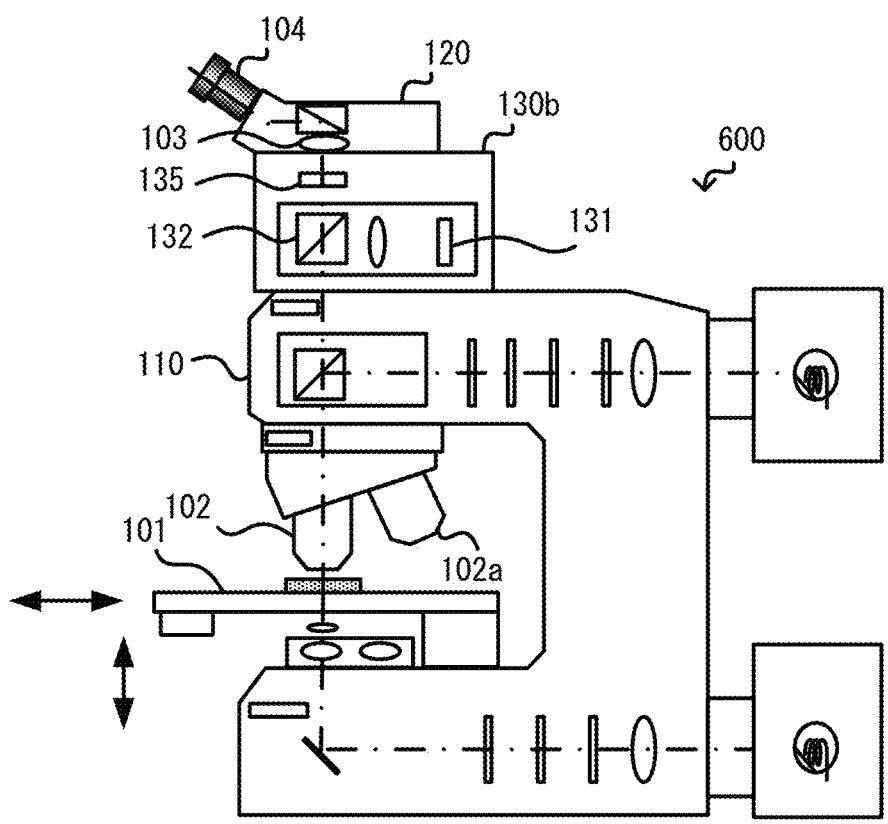
FIG. 13 illustrates the configuration of a microscope 600.

For example, the microscope system 1 may include a microscope 600 depicted in FIG. 13. The microscope 600 is provided with an intermediate lens tube 130b that includes a projection apparatus 135 using a transmissive liquid crystal device, instead of the intermediate lens tube 130. The above embodiments have been described by referring to the exemplary configurations in which a projection image is projected onto the image plane by deflecting light emitted from the projection apparatus 133 by means of the light deflection element 134 disposed on the light path between the objective 102 and the eyepiece 104. However, as depicted in FIG. 13, the projection apparatus 135 may be disposed on the light path between the objective 102 and the eyepiece 104.

The above embodiments have been described by referring to the examples in which an image sensor is included as the photodetector. However, the photodetector is not limited to an image sensor. For example, the above-described techniques may be provided for a scanning microscope, and in this case, the photodetector may be a photomultiplier tube (PMT).

The above embodiments have been described by referring to the examples in which the movement amount of the stage 101 is calculated on the basis of an image, but the movement amount of the stage 101 may be calculated using another method. For example, when the stage 101 is a motorized stage, the movement amount of the stage 101 may be calculated on the basis of instruction information for giving an instruction to move the motorized stage or may be calculated on the basis of output information from an encoder attached to the motor for the motorized stage. When the stage 101 is a manual stage, the movement amount of the stage 101 may be estimated on the basis of output information of an acceleration sensor attached to the stage 101.

The above embodiments have been described by exemplifying a keyboard, a mouse, a joystick, a touch panel, and the like as the input apparatus 40. However, the input apparatus 40 may be an apparatus that receives voice input, e.g., a microphone. In this case, the computer 20 may have a function for recognizing a voice instruction input from the input apparatus 40, and for example, the information acquisition section 24 included in the computer 20 may convert voice data into operation information by using a voice recognition technique and output the result to the projection image generation section 23.

What is claimed is:

1. A microscope system comprising:
   an eyepiece;
   an objective that guides light from a sample to the eyepiece;
   a tube lens that is disposed on a light path between the eyepiece and the objective and that forms an optical image of the sample based on light from the sample;
   a projection apparatus that projects first and second projection images onto an image plane on which the optical image is formed, in a manner such that the first and second projection images are distinguishable from each other, the first projection image being based on an analysis result provided by a computer for digital image data of the sample, and the second projection image being based on an input operation performed by a user and including at least input information provided by the user; and
   a hardware processor configured to analyze the digital image data and output an analysis result,
   wherein the hardware processor is configured to:
      classify one or more structures seen in a digital image represented by the digital image data into one or more classes, and
      output the analysis result including information specifying a position of a structure classified into at least one class of the one or more classes, and
   wherein the first projection image includes a graphic pattern indicating the position of the structure classified into the at least one class.

2. The microscope system of claim 1, wherein a display format of the second projection image is different from a display format of the first projection image.

3. The microscope system of claim 2, wherein the display formats include colors of the images or forms of lines forming the images.

4. The microscope system of claim 1, wherein a projection period of the second projection image is different from a projection period of the first projection image.

5. The microscope system of claim 1, wherein the hardware processor is further configured to:
   determine, for each of the first and second projection images, whether to project the projection image onto the image plane in accordance with a setting of the microscope system, and
   control the projection apparatus such that the projection apparatus projects the first and second projection images onto the image plane when the microscope system is in a predetermined setting.

6. The microscope system of claim 1, further comprising:
   a photodetector that detects light from the sample, the digital image data being generated based on a detection result provided by the photodetector; and
   a first light deflection element that is disposed on a light path between the eyepiece and the objective and that deflects light from the sample toward the photodetector.

7. The microscope system of claim 6, further comprising:
   a second light deflection element that is disposed on a light path between the image plane and the first light deflection element and that deflects light emitted from the projection apparatus toward the image plane.

8. The microscope system of claim 1, wherein the hardware processor is configured to analyze the digital image data by using a trained neural network.

9. The microscope system of claim 1, wherein the second projection image includes a graphic pattern indicating a region designated by the user as a region to which attention is to be given.

10. The microscope system of claim 9, further comprising:
    a stage on which the sample is placed,
    wherein the hardware processor is further configured to:
       calculate a movement amount of the stage; and
       based on the input operation and the movement amount, generate second projection image data representing the second projection image such that a position on the image plane at which the graphic pattern included in the second projection image is located changes in accordance with the movement amount.

11. The microscope system of claim 9, wherein the hardware processor is further configured to generate the second projection image data representing the second projection image based on a magnification of the optical image such that a size that the graphic pattern included in the second projection image has on the image plane changes in accordance with the magnification of the optical image.

12. The microscope system of claim 1, wherein the hardware processor is configured to record the digital image data, first projection image data representing the first projection image, and second projection image data representing the second projection image, such that the first projection image data and the second projection image data are recorded in association with the digital image data in a region different from a region in which the digital image data is stored.

13. The microscope system of claim 12, further comprising:
    an identification apparatus that obtains identification information assigned to the sample,
    wherein the hardware processor is further configured to record the identification information obtained by the identification apparatus in association with the digital image data.

14. The microscope system of claim 1, wherein the hardware processor is configured to:

generate composite image data based on the digital image data, first projection image data representing the first projection image, and second projection image data representing the second projection image, the composite image data being image data of a composite image obtained by compositing a digital image represented by the digital image data, the first projection image, and the second projection image; and control to display the digital image or the composite image on a display apparatus.

15. The microscope system of claim 14, wherein the hardware processor is configured to transmit image data to an external browsing system connected to the microscope system over a network, and wherein the external browsing system includes the display apparatus.

16. The microscope system of claim 1, wherein the hardware processor is configured to receive operation information input by a user of an external browsing system connected to the microscope system over a network, and wherein the input operation on which the second projection image is based is an input operation performed by the user of the external browsing system.

17. A microscope system comprising:

an eyepiece;

an objective that guides light from a sample to the eyepiece;

a tube lens that is disposed on a light path between the eyepiece and the objective and that forms an optical image of the sample based on light from the sample;

a projection apparatus that projects first and second projection images onto an image plane on which the optical image is formed, in a manner such that the first and second projection images are distinguishable from each other, the first projection image being based on an analysis result provided by a computer for digital image data of the sample, and the second projection image being based on an input operation performed by a user and including at least input information provided by the user; and a hardware processor configured to:

determine, for each of the first and second projection images, whether to project the projection image onto the image plane in accordance with a setting of the microscope system, and control the projection apparatus such that the projection apparatus projects the first and second projection images onto the image plane when the microscope system is in a predetermined setting.

18. A microscope system comprising:

an eyepiece;

an objective that guides light from a sample to the eyepiece;

a tube lens that is disposed on a light path between the eyepiece and the objective and that forms an optical image of the sample based on light from the sample;

a stage on which the sample is placed;

a projection apparatus that projects first and second projection images onto an image plane on which the optical image is formed, in a manner such that the first and second projection images are distinguishable from each other, the first projection image being based on an analysis result provided by a computer for digital image data of the sample, the second projection image being based on an input operation performed by a user and including at least input information provided by the user, and the second projection image including a graphic pattern indicating a region designated by the user as a region to which attention is to be given; and a hardware processor configured to:

calculate a movement amount of the stage; and based on the input operation and the movement amount, generate second projection image data representing the second projection image such that a position on the image plane at which the graphic pattern included in the second projection image is located changes in accordance with the movement amount.

19. A microscope system comprising:

an eyepiece;

an objective that guides light from a sample to the eyepiece;

a tube lens that is disposed on a light path between the eyepiece and the objective and that forms an optical image of the sample based on light from the sample;

a projection apparatus that projects first and second projection images onto an image plane on which the optical image is formed, in a manner such that the first and second projection images are distinguishable from each other, the first projection image being based on an analysis result provided by a computer for digital image data of the sample, and the second projection image being based on an input operation performed by a user and including at least input information provided by the user; and a hardware processor configured to:

generate composite image data based on the digital image data, first projection image data representing the first projection image, and second projection image data representing the second projection image, the composite image data being image data of a composite image obtained by compositing a digital image represented by the digital image data, the first projection image, and the second projection image;

control to display the digital image or the composite image on a display apparatus; and transmit image data to an external browsing system connected to the microscope system over a network, wherein the external browsing system includes the display apparatus.

* * * * *

UNITED STATES PATENT AND TRADEMARK OFFICE
CERTIFICATE OF CORRECTION

PATENT NO. : 11,662,565 B2
APPLICATION NO. : 17/196634
DATED : May 30, 2023
INVENTOR(S) : Akifumi Kabeya et al.

Page 1 of 1

It is certified that error appears in the above-identified patent and that said Letters Patent is hereby corrected as shown below:

On the Title Page

Item (73), change "EVIDENT CORPORATION" to -- Evident Corporation --.

Signed and Sealed this
Twenty-seventh Day of August, 2024

Katherine Kelly Vidal
*Director of the United States Patent and Trademark Office*